No. 731,920. PATENTED JUNE 23, 1903.
A. H. LEACH.
TEA OR COFFEE STRAINER.
APPLICATION FILED JAN. 5, 1903.
NO MODEL.
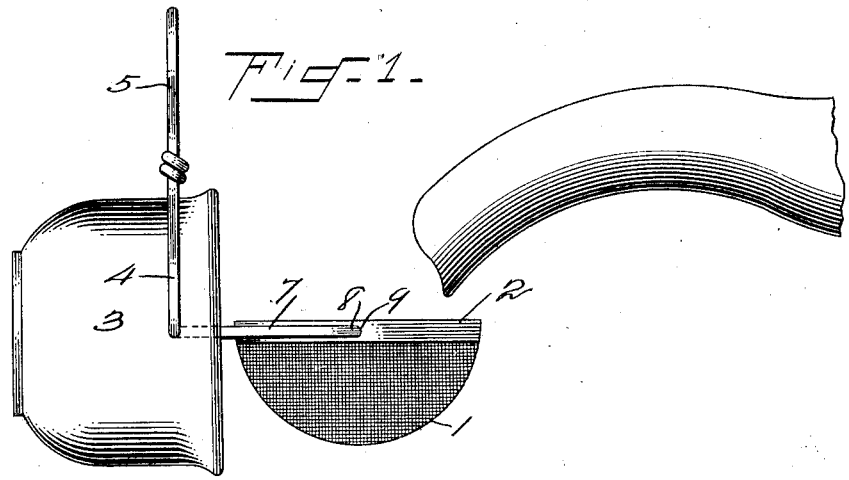
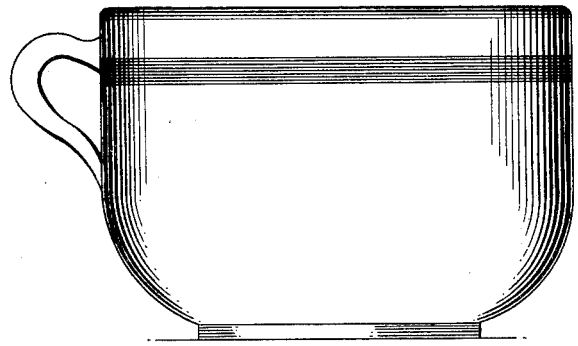
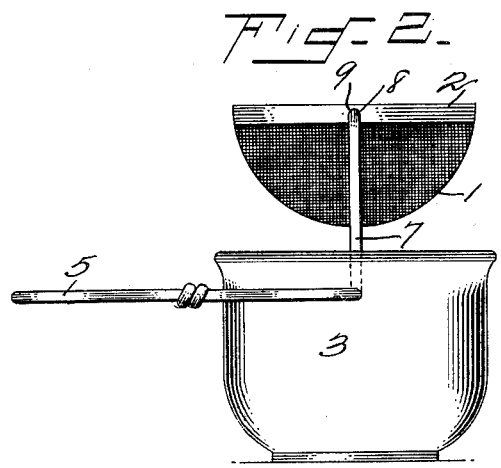
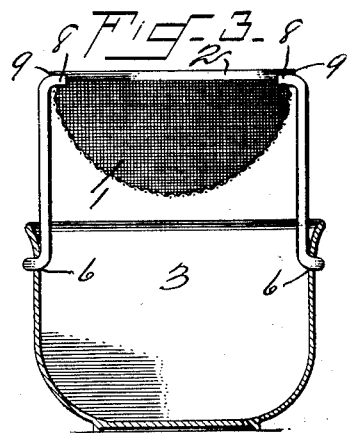
Inventor
Arthur Henry Leach,
Witnesses No. 731,920. Patented June 23, 1903.

UNITED STATES PATENT OFFICE.

ARTHUR HENRY LEACH, OF MIDDLEBORO, MASSACHUSETTS.

TEA OR COFFEE STRAINER.

SPECIFICATION forming part of Letters Patent No. 731,920, dated June 23, 1903.

Application filed January 5, 1903. Serial No. 137,938. (No model.)

*To all whom it may concern:*

Be it known that I, ARTHUR HENRY LEACH, a citizen of the United States, residing at Middleboro, in the county of Plymouth and State of Massachusetts, have invented certain new and useful Improvements in Tea or Coffee Strainers; and I do declare the following to be a full, clear, and exact description of the invention, such as will enable others skilled in the art to which it appertains to make and use the same.

This invention relates to improvements in tea and coffee strainers, and the object is to provide a strainer, in combination with a drip-cup, which will effectually prevent any drippings from the strainer falling upon the table-cloth.

Another object is to construct a strainer and supporting drip-cup therefor which after being used can be set upon the table, and which can be made cheap or as ornamental and fancy as desired, and which will form an attractive addition to the tableware.

A further object is to produce such a combined strainer and drip-cup which will be simple in construction, strong and durable, and well adapted for the use for which it is designed.

With these and other objects in view the invention consists in the construction and arrangement of parts, as will be hereinafter more fully described and claimed, reference being had to the accompanying drawings, in which—

Figure 1 is a side elevation illustrating the manner of using the strainer. Fig. 2 is a similar view of the device when not in use. Fig. 3 is a vertical sectional view of the device in the position shown in Fig. 2.

In the drawings, 1 denotes a tea or coffee strainer, preferably hemispherical or bowl shape, formed of fine-mesh wire screen or netting, having at its upper edge the usual annular metal binding ring or band 2.

3 denotes the drip-cup, which is of slightly-larger diameter than the strainer and of any desired shape or design, though preferably cup or bowl shape, as shown.

4 denotes a combined handle for the cup and support for the strainer and is preferably formed of a single piece of wire bent to form a loop-shaped handle 5 and then twisted. The ends of the wire are now brought half-way around each side of the cup and passed through openings 6 in the sides of the cup, near the upper edge thereof. The ends are now bent upwardly to form standards 7, the upper ends of which are then bent inwardly to form trunnions 8, which are adapted to engage openings 9, formed in the ring or band 2 of the strainer at points diametrically opposite the center of the same, and by this means the strainer is pivotally supported above the cup, and as the preponderance of the weight of the strainer is below the pivotal point of the same the strainer will always maintain a horizontal position no matter what position the drip-cup may be held in.

In use the drip-cup is held at an angle and in position to throw the strainer over a cup or other receptacle while the tea, coffee, or other liquid is being poured through the same, after which the cup is again set in an upright position upon the table, when the strainer will swing to its position above the cup, thereby causing any dripping to drop into the cup.

While I have described the handle of the drip-cup and the supports for the strainer as formed of one piece, it is obvious that I may construct the same separately and in a variety of ways.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus particularly described my invention, what I claim, and desire to secure by Letters Patent, is—

In a strainer, the combination of a drip-cup provided with openings at diametrically opposite sides, a strainer and a handle extending at right angles to the cup and having members extending into the cup through the said openings, thence bent to rigidly connect the handle to the cup, and finally extended upwardly to form standards, on which the strainer is pivotally mounted, substantially as described.

In testimony whereof I have hereunto set my hand in presence of two subscribing witnesses.

ARTHUR HENRY LEACH.

Witnesses:
CHARLES W. TURNER,
HENRY D. SMITH.